United States Patent [19]
Peschl

[11] 3,973,703
[45] Aug. 10, 1976

[54] DEVICE FOR DISHCARGING POWDERY OR GRANULAR MATERIAL

[75] Inventor: Ivan Anton Peschl, Sterksel, Netherlands

[73] Assignee: I.P.T. - Institute for Powder Technology, Schaan-Vaduz, Liechtenstein

[22] Filed: May 22, 1975

[21] Appl. No.: 579,840

Related U.S. Application Data

[63] Continuation-in-part of Ser. No. 471,842, May 21, 1974, abandoned.

[30] Foreign Application Priority Data

June 5, 1973  Netherlands.................. 7307777

[52] U.S. Cl. .............................................. 222/199
[51] Int. Cl.² .................................... B65G 65/70
[58] Field of Search ........... 222/199, 200, 275, 276, 222/409, 559, 560, 561, 55

[56] References Cited
UNITED STATES PATENTS

| | | | |
|---|---|---|---|
| 2,869,991 | 1/1959 | Williams et al. | 222/200 X |
| 2,872,073 | 3/1959 | Harper | 222/55 |

*Primary Examiner*—Allen N. Knowles
*Assistant Examiner*—Hadd Lane
*Attorney, Agent, or Firm*—Walter M. Rodgers; Walter A. Rodgers

[57] ABSTRACT

A device for discharging powdery or granular material comprises a plurality of inclined parallel plates reciprocably mounted relative to a base member and is adapted to release the powdery or granular material when the parallel plates are moved relative to the base member.

12 Claims, 8 Drawing Figures

DEVICE FOR DISCHARGING POWDERY OF GRANULAR MATERIAL

This is a continuation-in-part of application Ser. No. 471,842 filed May 21, 1974, now abandoned.

The invention relates to a device for discharging powdery or granular material from a bunker provided with an outlet port on the bottom side, said device comprising a member adapted to reciprocate for discharging purposes and having one or more passages.

The invention has for its object to provide a device of the kind set forth, in which it is ensured that at a standstill of the reciprocatory member no material flows away through the passages, whilst by actuating the reciprocatory member a metered quantity of material can be caused to flow out of the bunker.

According to the invention this can be achieved by providing the reciprocatory member with a plurality of strips bounding the passages and being at an angle to the direction of movement of the reciprocatory member and being each at an angle differing from 90° to vertical, the distance between the strips being such that at a standstill of the member the material forms a bridge between the upper edge of a first strip and a part of an adjacent strip, whilst the angle between at least the lower part of the strip and the horizontal, viewed in the outflow direction of the material, is larger than the angle of the first strip at which the material flows through the member when the reciprocatory member comes to a standstill.

By employing this construction no deadzones are formed during the reciprocatory movement of the member, where the material would not move and hence would not flow away, so that a regular and uniform supply of the desired quantity of material per unit time can be readily ensured, since there are no zones in which the material might lag behind for a long time. At the standstill of the reciprocatory member the outflow is automatically blocked by the formation of bridges between the strips. Since at least the strip portions located beneath the bridges formed are disposed so that these portions are at an angle to the horizontal which is larger than the angle of the slope the material tends to form when the reciprocatory member comes to a standstill, it is avoided that material is left behind on the strips beneath the bridges formed. In this way the material is prevented from adhering to said lower portions of the strips, so that a gradual local narrowing of the passages of the strips and consequent obturations are avoided. Such a risk is considerably reduced on those portions of the strips which support the material owing to the formation of the bridges, since when the material is discharged from the bunker or the like comparatively heavy friction forces are exerted on said portions of the strips, so that any material adhering thereto is loosened.

By using the construction according to the invention an increase in the number of reciprocations of the reciprocatory member per unit of time will result in a regular increase in the quantity of material conducted away per unit time, the divergence from the desired quantity being less than 1 percent of the quantity per unit time.

The invention will now be described more fully with reference to a few embodiments of the construction in accordance with the invention shown schematically in the accompanying drawings.

Figure 1:
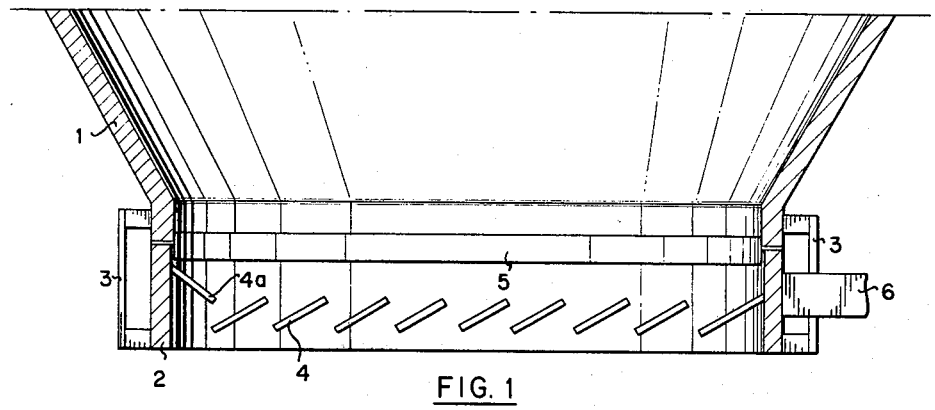
FIG. 1 is a schematic sectional view of the lower end of the outlet funnel of a bunker or the like provided with a device in accordance with the invention.

In the embodiment shown in FIG. 1 the lower end of an outlet funnel 1 of a bunker, a silo or the like has secured to it a rectangular frame 2 by means of a few leaf springs 3. In the frame 2 a plurality of equally spaced, parallel strips 4 are secured, which are at an angle $\alpha$ (FIG. 2) to the horizontal plane. From FIG. 1 it will appear that on the left-hand side of the frame 2 a strip 4a is fastened, whose lower end is located at a distance from the top end of the most adjacent strip 4, which distance corresponds with the distance between the top ends of two adjacent strips. A skirt 5 of flexible material, fastened to the funnel 1, extends over a given distance inside the frame 2. The frame 2 has furthermore secured to it a vibrator or a similar vibratory member 6.

Figure 2:
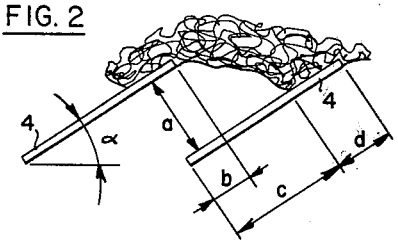
FIG. 2 is an enlarged schematic view of the disposition of two strips.

The distance $a$ (FIG. 2) between two adjacent strips 4 is chosen so that at a standstill of the frame 2 with the strips 4 secured thereto, that is to say, when the frame is not vibrated by the vibrator 6, the gap between adjacent strips is blocked by the formation of bridges of material as is shown schematically in FIG. 2.

In the case of powdery materials, which are usually cohesive, bridges are formed across the gap between the strips as a result of the cohesion of the material. In the case of cohesion-free, granular materials the gaps are closed by a bridge composed of grains, which bridge is in a stable state owing to the frictional forces produced between the grains and between the grains and the strips.

As soon as the grid formed by the frame 2 and the strips 4 is vibrated, the supporting points of the bridges formed at the standstill are pushed out of their state of equilibrium so that the material starts flowing away through the gaps between the strips. During the vibrations no bridges can be formed since as long as the strips are caused to reciprocate with the aid of the vibrator not any point of said strips remains either relatively or absolutely in contact with the same point of the lower side of the material contained in the outlet funnel 1 so that the formation of bridges is not possible by lack of fixed supporting points. Consequently the continuity of the flow of material is ensured as long as the strips are kept reciprocating. By increasing the number of reciprocations of the strips per unit time and/or by enlarging the stroke of the reciprocating strips the quantity of material conducted away per unit time out of the bunker will increase likewise. It has been found that by regulating the number of reciprocations of the strips per unit time and/or the amplitude of the stroke a very accurate regulation of the outlet can be achieved, the tolerance of the quantity to be conducted away per unit time lying within 1 percent.

Referring now to FIG. 2, when the bridge is formed between two adjacent strips 4, the width of a strip may be distinguished in a portion having a length $d$ limited by the upper edge of the strip and a point of the lower side of the bridge formed and a portion located beneath the bridge having a length $c$.

The portion $d$ is subject to the full pressure of the material contained in the bunker or the like so that at the reciprocation of the strips 4 heavy frictional forces are produced at the portion $d$ between the material and the strips. These frictional forces provide the desired conveying effect so that the material is pushed through the gaps between the strips. By choosing a great length $d$, for example, 5- to 20-times the distance $a$ between adjacent strips the outlet quantity per unit time may be drastically reduced since fewer strips can be built in per unit of surface. This is particularly important with strongly cohesive powders, since in this case a large surface has to be chosen for the outlet port in order to avoid the formation of bridges in the outlet funnel 1. The quantity of material to be conducted away per unit time is, however, determined by the requirements of the production so that despite the large dimensions of the outlet port the possibility has to be left to supply a small quantity per unit time. As will be apparent from the foregoing this can be achieved by choosing a larger length $d$.

There is practically no risk that material will adhere to the portions $d$ of the strips, since any material adhering to the portions $d$ will be readily loosened during the reciprocatory movement of the grid by the frictional forces exerted on said portions of the strips, this material being again conducted away through the gaps between the strips 4. Consequently, the strips 4 are self-cleaning across the portions $d$. This self-cleaning effect is particularly important in preventing the material from sticking to the strips, which might otherwise bring about variations of the size of the passage between successive strips, the operation of the device being thus adversely affected or even rendered impossible.

The portions $c$ of the strips located beneath the bridges formed at the standstill serves for guiding the material conducted away between the strips 4.

By the choice of the length $c$ the outlet capacity can be varied. With a small length $c$ the pressure of the material contained in the bunker or the like will push the material through the gap and in this case the supply capacity will be mainly determined by the pressure of the material contained in the bunker or the like.

If the length $c$ is chosen to be comparatively large, the speed of conveyance of the material on said portion of the strip may affect the supply capacity, since the frictional forces of the material on the strip over the length $c$ may counteract the pressure of the material contained in the bunker. Thus by varying the amplitude and/or the frequency of the movements of the shaking grid the speed of conveyance along the portion can be influenced so that also the resulting supply capacity is varied.

It is furthermore essentially important that the space beneath the bridge formed between adjacent strips at a standstill should empty itself completely so that no material is left on the portion $c$ of the strips 4, in order to avoid baking of material to said portions $c$ of the strips 4. During the supply of material this portion $c$ of the strip 4 is not subjected to heavy pressures so that any material adhering to said portions of the strips 4 would not be carried along during the supply of material. This might lead to a gradual clogging of the passages between the strips 4. In order to avoid this disadvantageous phenomenon, the angle $\alpha$ between the strip and the horizontal plane has to be larger than the natural angle of flow of the material respectively the angle of the slope the material tends to form when the reciprocatory member comes to a standstill. If this requirement is satisfied, all material located beneath the bridges formed between the strips 4 at a standstill will flow away along the strips and it will not be left behind on the portions $c$ of the strips 4.

It is shown in FIG. 2 that adjacent strips overlap one another to a given extent $b$. In some cases, for example, if a high supply capacity is desired and/or if strongly cohesive or coarse-granular materials have to be worked, it may be desired to provide a negative overlap as is shown in FIG. 3.

Figure 4:
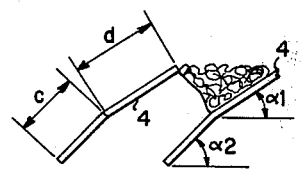
FIG. 4 illustrates schematically a third embodiment of the strips.

In order to ensure an effective formation of bridges and that no material is left beneath the bridges formed on the strips 4 it may in some cases be desirable to arrange the upper portion of a strip 4, which supports the bridge formed, at a smaller angle $\alpha_1$ to the horizontal than the lower portion of the strips, which is at an angle $\alpha_2$ to the horizontal which is larger than the angle $\alpha_1$ so that it is safeguarded that no material is left on the strips 4 beneath the bridges formed between the strips (FIG. 4). In the embodiment shown in FIG. 4 the strips comprise two portions at an angle to one another, but the strips 4 may, obviously, also have a curved shape in order to obtain the effect aimed at.

Figure 3:
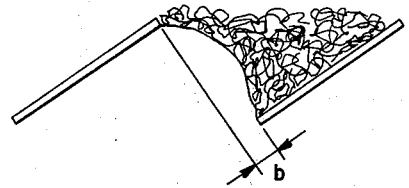
FIG. 3 is an enlarged, schematic view of a second potential disposition of two strips.

Whereas in the embodiments shown in FIGS. 1 to 3 the distance $a$ between the strips 4 remains the same (at any rate, viewed in the direction of flow of the material, this distance must not be smaller), the distance between the strips in the embodiment shown in FIG. 4, viewed in the direction of flow of the material becomes gradually larger. This is very important for handling very elastic materials. The material located between the strips, emerging from a reqion where the material was subjected to a comparatively high pressure, will expand and may exert comparatively heavy forces on the strips 4, when the passage between the strips 4 remains the same. The resultant frictional forces may exceed the pressures exerted on the material so that the outflow of material may stop. The embodiment shown in FIG. 4 provides, however, the additional advantage that the material has sufficient space for expansion without resulting in heavy resistive forces so that the risk of clogging does not occur.

Figure 5:
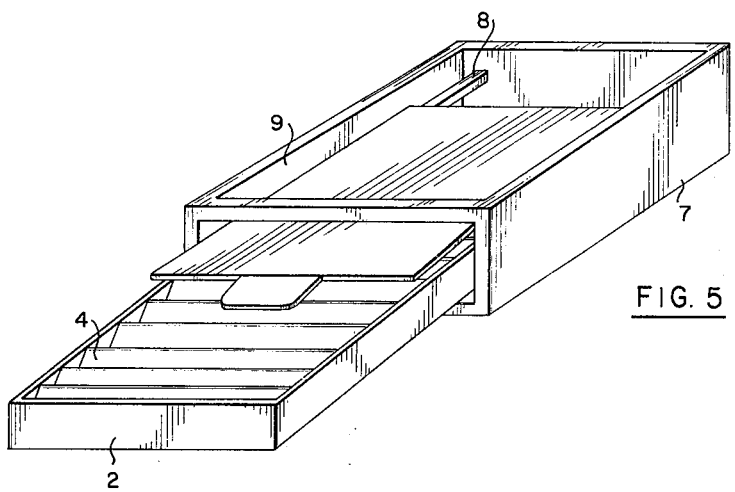
FIG. 5 shows schematically a possibility of arranging the strips in an exchangeable manner.

In the embodiment shown schematically in FIG. 5 the shaking grid formed by the frame 2 and the strips 4 can be slipped into and out of a box open on the bottom and top sides, which box 7 may be coupled, like in the embodiment shown in FIG. 1, with the aid of resilient strips 3 or by means of coupling rods pivoted to the box and to the funnel 1 with the funnel 1. The vibrator 6 will then be mounted on the box.

Normally the shaking grating 2, 4 will be completely enclosed in the box 7, whilst the open front side will be closed by a cover plate or the like. In order to remove the shaking grating 2, 4, for example, for cleaning purposes or for exchange, said plate can be removed, after which the shaking grating 2, 4 can be slipped out of the box 7. If the grating 2, 4 has to be completely removed, when the bunker is wholly or partly filled, fillets 8 may be provided in the box 7 for holding a closing lid 9 in the box, slipped in before the grating 2, 4 is removed.

Figure 6:
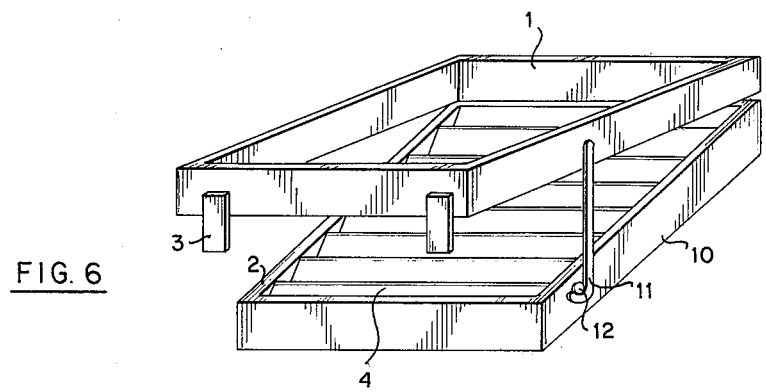
FIG. 6 illustrates schematically a second possibility of arranging the strips in an exchangeable manner.

A further possibility of readily exchanging the shaking grating is illustrated in FIG. 6. In this embodiment the grating formed by the frame 2 and the strips 4 is releasably arranged in a frame 10, which is coupled with the bottom side of the funnel 1 by means of the resilient strips 3 and the pivot bolts. The strips 3 or the bolts are coupled with the frame 10 so as to be readily detachable at least on one side of the frame 10. By releasing the strips or bolts concerned the frame 10 can turn about the strips or bolts located on the other side of the frame 10 into the position shown in FIG. 6, in which the frame 10 is supported near its front by hooks 11 fastened to the funnel 1 and by stops 12 fastened to the frame 10 and co-operating with the former. When the frame 10 is turned into the position shown in FIG. 6, the frame 2 with the strips 4 can be readily removed from the frame 10 and be cleaned or be exchanged for a different frame 2 with strips 4. As a matter of course, precautions are made also in this case for closing the silo, when the grating 2, 4 has to be removed whilst the bunker is wholly or partly filled.

Figure 7:
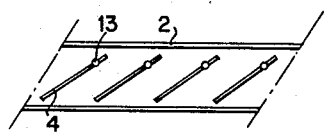
FIG. 7 shows an embodiment of adjustable strips.

FIG. 7 shows a further variant of the construction, in which the strips 4 are arranged in the frame 2 so as to be pivotable about studs 13, fastened to the strips and extending parallel to the longitudinal axes of the strips and located near the top ends of the strips 4. Means (not shown) will be provided to turn the strips 4 about the studs 13 and to fix the same in the desired position. By turning the strips 4 about the studs 13 the angle between the strips 4 and the horizontal and the size of the space between the strips can be varied. The use of such a construction provides various advantages.

By altering the position of the strips 4 the supply capacity can be varied, whilst the position of the strips 4 can be adapted to different properties of the material to be handled by the device. By setting the strips 4 in a vertical position by a turn about the studs 13 any material clogged between the strips 4 in their normal working position can be caused to fall off from between the strips due to the resultant increase in space between the strips.

This construction has a further advantage when materials are used whose adhesion to the strips is practically unavoidable. By changing after some time the size of the gaps between the strips because of such a growth, the necessity of cleaning the strips may be postponed for a fairly long time until a more suitable moment so that stagnations in the work can be considerably reduced.

The strips may furthermore be adjusted so that they completely close the outlet port, which is advantageous when the device is employed on transportable bunkers or the like. When the bunker is transported, the outlet port can be closed by the strips 4 so that no material will flow out of the bunker due to vibrations produced in transport.

When the bunker is being filled, it may be advantageous that the outlet port can be closed by means of the strips because when the bunker is being filled, certain powders are mixed with air and may thus exhibit flow properties such that even without the reciprocatory movement of the strips 4 the powders may emerge from between the strips during the filling operation. The passage can be closed during the filling operation by turning the strips. When such a material has been standing still in the bunker for some time and the air or the gas has escaped, such materials generally exhibit strongly cohesive properties so that subsequently the distance between the strips 4 has to be readjusted by turning the strips in accordance with the degree of venting.

Figure 8:
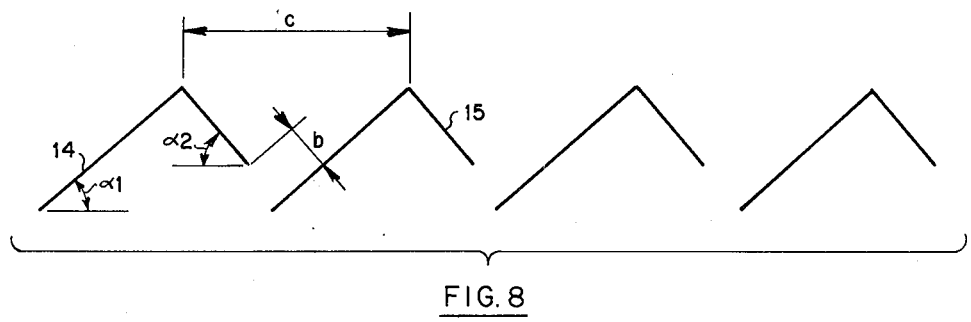
FIG. 8 is a schematic view of another embodiment of this invention.

In the embodiment shown in FIG. 8 the grid is formed by a number of parallel first strips 14 and a number of parallel second strips 15 fixed to the upper ends of the strips 14 and extending transverse with respect to strips 14.

The angles $\alpha_1$ and $\alpha_2$ may be the same or differ from each other as long as the angle of the lower part of strip 14 is larger than the slope the material tends to follow when the reciprocatory grid comes to a stand still. Then a bridge is formed over the gap $b$.

In this arrangement the distance $c$ can be relatively large, so that for a given dimension of the outlet port of a bunker there will be yet a relatively small number of openings for the outflow of material. Thereby the arrangement of the strips 14 and 15 prevents the occurrence of dead zones especially as in this arrangement the strips can be arranged under a relatively big angle with respect to the horizontal. Eventually the strips 14 and 15 can be made adjustable as described with FIG. 7.

I claim:

1. A device for the discharge of powdery or granular material from a bunker having an outlet port on the bottom side thereof and comprising a member mounted for reciprocation and having one or more passages, said device being characterized in that the reciprocatory member is provided with a plurality of strips bounding said passages and being at an angle to the direction of movement of the reciprocatory member and being each at an angle differing from 90° to vertical, the distance between the strips being such that at a standstill of said member a bridge of the material is formed between the top edge of one of said strips and a part of the adjacent strip, and the angle between at least the lower part of said one strip and horizontal, viewed in the direction of flow of the material, is larger than the angle of said one strip at which the material flows through said member when the reciprocatory member comes to a standstill, and means to reciprocate said member in a direction transverse to said strips to cause dispensing.

2. A device according to claim 1 and characterized in that the angle between a strip and the plane going through the outlet port is adjustable.

3. A device according to claim 1 and characterized in that the number of reciprocatory movements per unit time of the reciprocatory member can be regulated.

4. A device according to claim 1 and characterized in that the amplitude of the stroke of the reciprocatory member is adjustable.

5. A device according to claim 1 and characterized in that the angle between the top portion of the strip and the horizontal is smaller than the angle between the lower portion of the strip and the horizontal.

6. A device according to claim 1 and characterized in that the distance between two adjacent strips, viewed in the direction of flow of the material, increases.

7. A device according to claim 1 and characterized in that two adjacent strips exhibit a negative overlap.

8. A device according to claim 1 and characterized in that the strips are adjustable about pivotal shafts located near the top ends of the strips and extending parallel to the axes of length of the strips.

9. A device according to claim 1 and characterized in that the strips are arranged in a readily removable frame.

10. A device according to claim 1 and characterized in that the frame holding the strips is slidably accommodated in a tray pivoted to the bottom side of a bunker.

11. A device according to claim 1 and characterized in that the frame holding the strips is removably arranged in a supporting frame pivoted to the bottom side of a bunker.

12. A device for the discharge of powdery material from a bunker provided with an outlet port on the bottom side, said device comprising a member mounted for reciprocation for the discharge having one or more passages and characterized in that the reciprocatory member is provided with a plurality of first strips being at an angle to the direction of movement of the reciprocatory member and being each at an angle differing from 90° to the plane going through the outlet port and in that said reciprocatory member is provided with a plurality of second strips, each of said second strips being fixed to a first strip and extending from said first strip toward an adjacent first strip such that a passage is formed between a free edge of said second strip and said adjacent first strip, each of said second strips being at an angle differing from 90° to the plane going through the outlet port and being at an angle to the direction of movement of the reciprocating member, and the distance between a free edge of a second strip and said adjacent first strip being such that at a standstill of said member a bridge is formed between said edge and said adjacent first strip while the angle between at least the lower part of said adjacent strip and the horizontal is larger than the angle of the slope the material tends to follow when said member comes to a standstill, and means to reciprocate said member in a direction transverse to said slats to cause dispensing.

* * * * *